United States Patent [19]
Krenkel et al.

[11] Patent Number: 6,025,062
[45] Date of Patent: Feb. 15, 2000

[54] COGGED COMPONENT FOR THE MECHANICAL TRANSMISSION OF FORCE

[75] Inventors: Walter Krenkel, Renningen; Richard Kochendoerfer, Stuttgart, both of Germany

[73] Assignee: Deutsches Zentrum fur Luft-und Raumfahrt E.V., Bonn, Germany

[21] Appl. No.: 09/047,093

[22] Filed: Mar. 24, 1998

[30] Foreign Application Priority Data

Mar. 24, 1997 [DE] Germany .......................... 197 12 287

[51] Int. Cl.⁷ ...................................................... D04H 9/00
[52] U.S. Cl. .......................... 428/293; 428/408; 428/294; 428/367; 74/457; 74/462; 74/431; 74/439; 74/448; 305/194
[58] Field of Search ............................... 74/457, 462, 431, 74/439, 448; 428/293.4, 293.7, 294.1, 367, 66.1, 66.7, 408; 305/194

[56] References Cited

U.S. PATENT DOCUMENTS

| | | | |
|---|---|---|---|
| 3,759,353 | 9/1973 | Marlin | 428/408 |
| 4,237,175 | 12/1980 | Kobayashi | 428/408 |
| 4,515,860 | 5/1985 | Holzl | 428/408 |
| 4,668,579 | 5/1987 | Strangman | 428/408 |
| 5,211,999 | 5/1993 | Okada | 428/293.4 |
| 5,230,951 | 7/1993 | Birchall et al. | 428/293.4 |
| 5,288,556 | 2/1994 | Lamalson | 428/408 |
| 5,391,428 | 2/1995 | Zender | 428/297 |
| 5,829,850 | 11/1998 | Ketting | 305/194 |

FOREIGN PATENT DOCUMENTS

| | | |
|---|---|---|
| 0166181 | 1/1986 | European Pat. Off. . |
| 2825191 | 1/1979 | Germany . |
| 4003178 | 9/1990 | Germany . |
| 4315355 | 11/1994 | Germany . |

*Primary Examiner*—Deborah Jones
*Assistant Examiner*—Jason Resnick
*Attorney, Agent, or Firm*—Milde, Hoffberg & MacKlin, LLP

[57] ABSTRACT

A cogged component, especially a wheel, rack, pinion, spline, or similar structure, intended for the mechanical transmission of force. The body is of a composite reinforced with carbon fibers. The body is, in accordance with the invention, of fiber-reinforced ceramic comprising a lattice of essentially continuous carbon fibers and a matrix that contains carbon. The fibers in the lattice are sheathed in silicon carbide formed essentially by liquid silicon infiltrating the lattice and reacting with the carbon in the matrix. The cogs are constructed either of a similar fiber-reinforced ceramic with a load-accommodating fiber orientation or of a monolithic ceramic.

20 Claims, 3 Drawing Sheets

COGGED COMPONENT FOR THE MECHANICAL TRANSMISSION OF FORCE

BACKGROUND OF THE INVENTION

The present invention concerns a cogged component, especially a wheel, rack, pinion, spline, or similar structure, intended for the mechanical transmission of force and with a body of a composite reinforced with carbon fibers.

Components of this type in the form of cogwheels are known from the German Patent No. 2,825,191 C2, which describes a wheel composed of several layers, bonded together with a binder, of a fabric woven out of bunches of threads of carbon with the warp at a right angle to the woof and with each layer rotated such that the warp and woof in one layer is at an angle to the warp and woof in the adjacent layer. This cogwheel is characterized in that the threads in the warp and woof are equidistant from each other and in that the warp and woof in the second layer of fabric are at an angle of 45° C. to the warp and woof in the first layer, in that the warp and woof in the second layer are at an angle of 22.5° C. to the warp and woof in the first layer, and in that the warp and woof in the third layer are at an angle of 67.5° C. to the warp and woof in the first layer. The binder can be a liquid thermoplastic, an epoxide for example.

The European Patent No. 0,166,181 B1 describes a wheel for transmitting forces that is molded of synthetic resin reinforced with 3 to 5% carbon fibers and 30 to 35 glass fibers by weight. Nylon is mentioned as a synthetic material.

The German Patent No. 4,003,178 A1 describes a cogwheel with a molded-on cogged section of reinforced and hot-pressed phenolic resin. The reinforcement is a fabric of twisted metharomatic polyamide fibers. The phenol resin is impregnated with epoxide.

The European Patent No. 4,003,178 A1 describes a component with cogs of cast or injection-molded polymer reinforced with fiber fillers. The surface of the component that meshes with another component is provided with a thin, in relation to its overall dimensions, integrated layer of polymer without any fillers. This layer is intended to prevent abrasive wear on the surface.

The German Patent No. 4,315,355 (corresponding to U.S. Pat. No. 5,829,850) describes a wheel segment fastened to a disk and intended for driving articulated vehicle tracks, conveyor belts, and similar mechanisms. Either the overall segment, its cogs, or parts of the cogs, are of hard metal, fiber-reinforced composite, or ceramic-ceramic composites, engineered ceramics, or high-performance ceramics, preferably of wear-resistant sintered-iron based materials with a special, preferably wear-reducing, protective layer and a starting powder of ferro-chromium and iron as matrix materials and boron carbide as a mechanically resistant phase, or of zirconium oxides, or based on such non-oxide ceramics as silicon nitride for example, with less than 15% sintering material added by weight.

SUMMARY OF THE INVENTION

With the aforesaid state of the art as a point of departure, the principal object of the present invention is to provide a cogged component intended for the mechanical transmission of force, with high mechanical strength, outstanding heat resistance, and high resistance to corrosion and wear, and that will not become noisy after long operation at high loads.

This object, as well as further objects and advantages which will become apparent from the discussion that follows, are achieved, in accordance with the present invention, in a component of the aforesaid genus in that its body is of fiber-reinforced ceramic comprising a lattice of essentially continuous carbon fibers and a matrix that contains carbon, whereby the fibers in the lattice are sheathed in silicon carbide formed essentially by liquid silicon infiltrating the lattice and reacting with the carbon in the matrix, and in that the cogs are constructed either of a similar fiber-reinforced ceramic with a load-accommodating fiber orientation or of a monolithic ceramic. A component of this kind will be very resistant to abrasive wear, fracture, chemicals, and corrosion because of the special materials it is made of. Its resistance to heat and fatigue is superior to that of the known materials employed to construct cogged component at the state of the art. Another essential advantage of a component in accordance with the present invention is its low thermal expansion even during long-term operation, which also contributes to its outstanding dimensional stability. Its dimensional stability in turn ensures precise engagement between two such components and accordingly quiet operation in contrast to conventional cogwheels, which lose tolerance when they become hot. The quiet operation of such components makes them highly desirable in many applications. Finally, such components are also much lighter in weight than metal cogwheels in that a cogged component in accordance with the present invention will have a higher mass-specific strength than one made of an iron-based material. The cogged component in accordance with the present invention is also more satisfactory than cogwheels of such monolithic ceramics as silicon carbide or silicon nitride because of its essentially better tolerance of damage, meaning that any cracking that might occur during operation will be halted by the embedded fibers.

The elongation at rupture of the cogs in the component in accordance with the present invention must be higher than 0.1% no matter what material they are made of.

Components in accordance with the present invention can be of almost any size desired. It is in the context of advantage to begin with a lattice of carbon fibers embedded in a matrix that contains carbon. The silicon can then infiltrate into a prescribed microfissure structure in the lattice and react essentially with the carbon in the matrix to form silicon carbide, resulting in a dense, strong, abrasion-resistant, but light-weight structure with the silicon carbide sheathing the carbon fibers. Well-defined fissures for the silicon to infiltrate can preferably be produced by embedding the carbon lattice in a matrix of polymer containing a high level of carbon and pyrolyzing the resulting material at approximately 900° C. This piece will then constitute the body of the cogged component, and cogs made of an appropriate ceramic reinforced with fibers with a load-accommodating orientation or of a monolithic ceramic can be inserted into it. Such cogs can be produced either along with the body or in a separate step and form-fit and force-fit into it.

The aforesaid method of manufacturing the body allows the basic shape of the cogged component to be initially produced from carbon in the raw state before ceramicizing it by allowing the liquid silicon to infiltrate it and react with the free carbon to form silicon carbide. Although the finished cogged component will be as strong as a ceramic, it will be much easier to machine from a blank of the aforesaid description.

To provide standardized pieces that can be assembled into cogged components, it is of advantage to fabricate the cogs and bodies separately. The individual cogs can be fabricated as standard pieces and inserted into the particular, individually fabricated bodies. It is also possible to fabricate cogs with widely varying fiber orientations to accommodate various loads in accordance with particular applications. Separate cogs can be preferably fastened to the body by an adhesive layer essentially consisting of silicon carbide. The advantage is that the cogs can be fastened to the body with essentially the same material, so that, even when they are separate parts, their structure will be the same as that of the body, and powerful forces can be transmitted between the cogs and the body. Separate fabrication of the cogs also allows any damaged cogs to be replaced after a long period of operation. It is in this context of further advantage to employ a layer of essentially silicon as an adhesive. Such an adhesive can be liquified by appropriately heating it to above 1410° C. to loosen the damaged cog, and the replacement can be fastened in place with another layer of liquid silicon or silicon carbide.

Separate cogs can also be fabricated in the form of rod-like pieces, in the form for example of blanks of a lattice of carbon embedded in a matrix of polymer or carbon, with the rods or bars extensively having the same cross-section as the cogs, which can then be machined out of the rod-like pieces once they have been ceramicized. The blanks can be provided with specific sites of subsequent separation in the form of incisions in the bars or rod-like pieces to facilitate machining the cogs.

There is another advantage to fabricating the body and the cogs separately when the cogs are of fiber-reinforced ceramic in that the fiber orientation in both the body and the cogs can be adapted to the forces that occur when the cogged component is in operation. This advantage is very significant in that such cogwheels can be subjected, depending on the application, mainly to tensile forces in the body and mainly to bending and shearing forces in the cogs. Since fiber-reinforced materials in general, and fiber-reinforced ceramics in particular, can accommodate the most powerful tensile forces parallel to the fiber orientation, the orientation of the fibers in the body differs from that in the cogs in accordance with the present invention because the main directions of load differ therein.

When the cogs are of monolithic ceramic, the ceramic should be sintered, pressed, or reaction-bonded silicon carbide, e.g. SSiC, HPSiC, or SiSiC, because such ceramics will expand similarly to a fiber-reinforced body ceramicized with silicon carbide, ensuring compatible expansion in pieces fastened together long-term.

To ensure that the cogs will be highly stable, at least some of their lattice of fibers should consist of two-dimensional layers of fabric with warp threads and woof threads at a right angle to each other. Depending on the particular stresses that the cogs in the cogged component being manufactured will be subject to throughout their contour, the layers of fabric will preferably be oriented paralleling the longitudinal axis of the cog as will be explained in the specification hereinafter.

For applications that demand that the surface of the cogs be particularly hard and abrasive-resistant, they can be constructed modular. In this procedure, a fracture-resistant core is produced as a support and provided with a jacket of wear-resistant ceramic. The core itself can be of carbon, preferably graphite. It is preferable for the core to be of high-tenacity ceramic reinforced with fibers, carbon fibers, that is, and for the jacket to be of a ceramic with a high level of carbon fibers. The core and jacket can in this event as well be fastened together with liquid silicon or silicon carbide, optionally in the form of paste, resulting in a highly rigid bond with no stress occurring in the vicinity.

To adapt the cogs even more specifically to particular demands on the component, the jacket can be wrapped around the core with the fibers of carbon extending either along the circumference or paralleling the axis.

It is of advantage for a substantial portion of the carbon fibers in the jacket or, if the cogs are in one piece, in the cog as a whole to parallel the cog's longitudinal axis, the radial extent of the cog on the wheel, that is. This approach will ensure accommodation of maximal mechanical tensile or bending load when the wheel is engaged, in a transmission for example.

Another requirement to adhere to when the cogwheels are preponderantly exposed to thrust, is that a substantial portion of the carbon fibers in the cogs be oriented tangential to the cog's flank. This approach reduces wear and stabilizes shape and size, ensuring quiet operation.

The body of the cogged component can be fabricated round, when it is built up, especially in the form of a ring or disk, with the carbon fibers oriented circumferentially and/or radially to the axis of rotation. A body of this kind will be able to withstand powerful mechanical forces.

To ensure simple and cost-effective manufacture of a cogged component in accordance with the present invention, it has been demonstrated practical for the body and/or cogs to be fabricated out of a two-dimensionally fiber-reinforced slab of ceramic. A large slab is accordingly constructed with its lattice of carbon fibers oriented in accordance with the basic requirements. The orientation of the cogs and of the body is then established on the slab and the cog contour cut out of it. The body can then be ceramicized in accordance with the present invention with liquid silicon that infiltrates and reacts with the free carbon into silicon carbide. It is on the other hand possible to ceramicize the work first and then cut the cog contour out of it, although this procedure is labor-intensive and accordingly not preferred. The slab is usually as thick as the body and cogs are intended to be. Several thinner slabs, however, can also be sandwiched together into a thick slab with the paste specified in the foregoing for fastening the cogs to the body. The resulting stack can be employed as a starting material for the final component.

To fasten cogs fabricated as separate parts into a body even more securely, joints similar to mortise-and-tenon joints, preferably wedged or dovetailed, have been demonstrated practical. The wedge-shaped base of the cog is for this purpose either inserted in its original form into a matching tapering groove in the body or specially shaped for insertion into matching recesses in the body. Such cogs can be inserted from one side of the body to the other or radially outward through special bores when the body is annular. The cog can be further secured and fixed with flange-like projections resting against the surfaces of the body at the end remote from the crest of the cog.

Another advantage of a cogged component in accordance with the present invention is that it can be employed without damage in aggressive environments, in corrosive media for example. It can also be employed for long periods in regions of high temperature, even those higher than 1500° C. A cogged component in accordance with the present invention can be further protected from corrosion or oxidation with a protective coat. Such a coat can easily be a layer of chemical-vapor-deposed silicon carbide.

All types of carbon fibers can be employed to manufacture components in accordance with the present invention, although high-modulus (HM) fibers are preferred. To increase the strength and resistance to fracture of the liquid, the fibers can be sheathed with carbon, silicon carbide, or boron nitride before being embedded in the polymer matrix.

Cogged components in accordance with the present invention can be employed in various fields of technology as high-performance cogwheels for such light-weight devices as helicopters, in automotive and drive technologies, for motors and transmissions for example, as components of machinery employed in the textile, tool, and conveyor industries, and, due to their low moments of inertia, in high-performance and high-speed transmissions.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
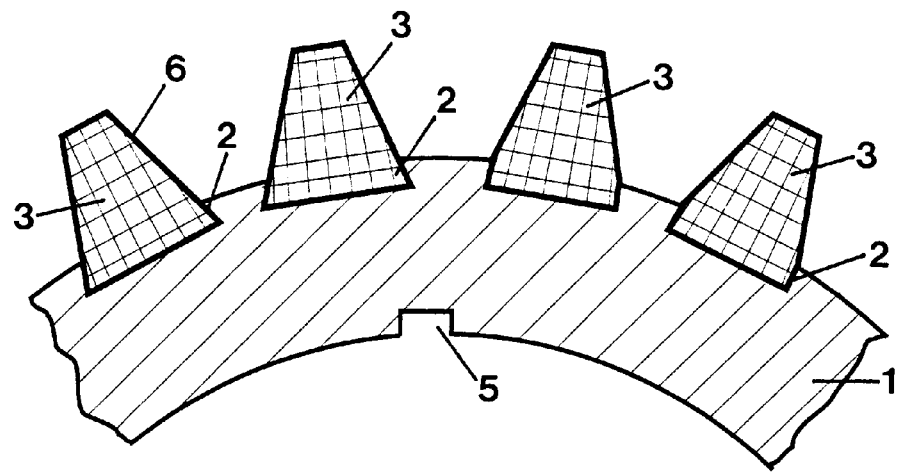
FIG. 1 is a schematic section, perpendicular to its axis of rotation, through part of a cogged component with an annular body with several cogs inserted in it.

The preferred embodiments of the present invention will now be described with reference to FIGS. 1–5 of the drawings. Identical elements in the various figures are designated with the same reference numerals.

The cogged component in accordance with the present invention and illustrated in FIG. 1 comprises an annular body 1 with several cogs 3 inserted into matching grooves 2 along its circumference. Only a segment of the body is illustrated. A radially cogged wheel of this type can be manufactured from a lattice of essentially continuous carbon fibers in a matrix that includes carbon. This porous carbon blank is essentially the same shape as the final body, the annular body illustrated in FIG. 1 for instance. The inner and outer surfaces of body 1 can be machined out of the lattice. Wedge-shaped grooves 5 can for example be introduced into its inner surface to secure the cogwheel to a shaft. The grooves 2 in the outer surface can be introduced in a specific shape and size to accommodate matching cogs 3. Before the machining, the carbon fibers are embedded in a matrix of polymer and the matrix pyrolized in nitrogen or argon to generate fissures of a prescribed structure around the fibers. Next, liquid silicon is allowed to infiltrate the fissures at temperatures of 1450 to 1500 ° C. in a vacuum. The silicon is then allowed to react with the free carbon either at a temperature of approximately 1650° C., preferably for two hours, or at a temperature of up to 2000° C. for up to one hour. These parameters are particularly desirable because only a little free silicon is left over, almost all of it having been converted into silicon carbide. The result is outstanding resistance to heat and chemicals, especially aggressive caustics or other aggressive environments that the cogwheel may be employed in.

Cogs 3 can be of the same material as the body 1 and, in fact, can be fabricated in the same way as the body 1. Cogs 3 can on the other hand be of monolithic ceramic. Monolithic-ceramic cogs are preferred when fiber-reinforced ceramic is not resistant enough to the chemistry of the lubricants employed. Cogs of a carbon lattice infiltrated by liquid silicon, of fiber-reinforced ceramic in other words, is preferred in all other situations.

FIG. 1 illustrates how cogs 3 can be inserted in the grooves 2 in annular body 1. The two cogs 3 on the right of FIG. 1 are inserted in grooves 2 with upright sides (i.e., grooves with a rectangular cross-section) and the two on the left in grooves 2 with sides that slope in toward the outer surface of annular body 1 (i.e., with a wedge-shaped cross-section). The wedge-shaped cross-section of the grooves 2 on the left matches the slope of the side 6 of cog 3. Cogs of this shape can be inserted axially into grooves 2 of the body 1 and secured with a layer of paste high in carbon and supplied with liquid silicon that subsequently reacts with the carbon at a temperature of 1450 to 1650° C. to form silicon carbide, thus anchoring the respective tooth 3 in the groove 2. Joints involving wedge-shaped structures like the two cogs 3 illustrated on the left side of FIG. 1 are particularly rigid and stable against forces radial to the component's axis 4 of rotation. One advantage of a groove 2 that slopes at the same angle as the side 6 of cog 3 is that the cogs need to be extended more or less at the same angle as their sides only far enough to fit into the grooves. Cogs 3 can also be secured in grooves 2 with a layer of silicon-carbide paste. This paste is applied in the groove 2 and/or to the bottom of the cog 3.

Figure 2:
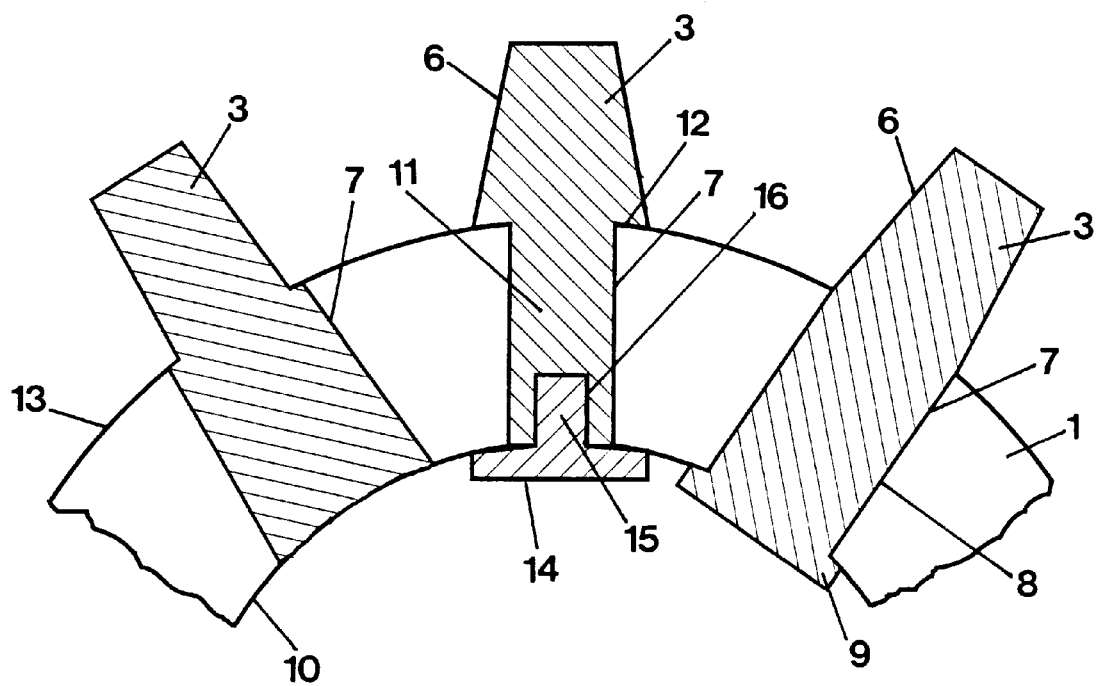
FIG. 2 is a section similar to that in FIG. 1 illustrating three cogs differently secured in the annular body.

FIG. 2 illustrates three other preferred methods of securing cogs 3 in a body 1. Common to all three methods is that cogs 3 are accommodated in bores 7 of the annular body 1. These bores extend through annular body 1 from its inner surface 10 to its outer surface 13. The cog 3 inserted into the bore 7 on the right of FIG. 2 comprises two sections.

One section projects radially out beyond outer surface 13 and includes the tapered sides 6 of cog 3. Attached to it is a cylindrical section 8 which terminates in a flange 9. Flange 9 rests against the inner surface 10 of annular body 1 and prevents cog 3 from slipping radially outward.

The middle cog 3 of the three illustrated in FIG. 2 also has an outer section with tapered sides 6 and an adjacent cylindrical section 11. Cylindrical section 11, however, is narrower than the base of the tapered outer section and than the cylindrical section 8 of the cog 3 on the right of the figure. The outer section with the tapered side 6 of the middle cog 3 terminates in a surface 12 that rests against the outer surface 13 of annular body 1. Resting against the inner surface of annular body 1 is a disk-shaped piece 14 with a bolt-like projection 15 extending out of its center and into a matching bore 16 that extends part-way into cylindrical section 11. To ensure permanent fastening, all interfaces, specifically that between cog 3 and its cylindrical section 11, that between disk-shaped piece 14 and the inner surface 10 of annular body 1, and that between bolt-like projection 15 and bore 16 can be provided with a layer of liquid silicon or of silicon-carbide paste formed as hereintofore specified.

Finally, the section of the cog 3 illustrated on the left of FIG. 2 that extends through the bore 7 in annular body 1 tapers together radially outward and continues radially outward in an appropriately dimensioned tapering form toward the crest of the cog from the inner surface 10 to the outer surface 13 of the body 1. Such a shape contributes to radially securing cog 3 in the body 1.

Whereas FIG. 2 illustrates the basic shapes of the cogs 3 in themselves that help secure them in position in the annular body 1. FIGS. 3A, 3B, 3C, 3D, 3E, and 3F illustrate examples of cogs 3 constructed in accordance with the construction of annular body 1 of a bidirectional fiber lattice of essentially continuous carbon fibers and of a matrix that contains carbon, the same material, that is, as the annular body 1 that accommodates cogs 3.

The lines and points in FIGS. 3A through 3F schematically represent the various orientations of the carbon fibers in the lattice. The fibers in the cogs 3 illustrated in FIGS. 3A, 3B, 3C, and 3D are in the form of two-dimensional fabrics with warps and woof at right angles. This orthogonal reinforcement results in anisotropic mechanical and physical properties that can be exploited to advantage in various applications.

Figure 3A:
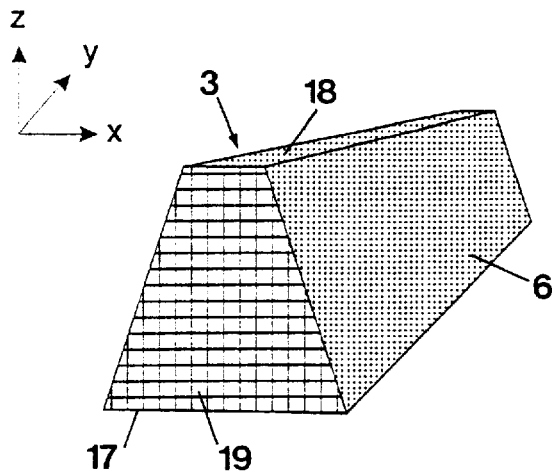
FIGS. 3A through 3F are schematic perspective views of cogs with variously oriented fibers.

The structure of the cog 3 illustrated in FIG. 3A is particularly resistant to bending along the Z axis (in the system of coordinates with X, Y, and Z axes illustrated in FIG. 3A, which is also applicable to the other FIGS. 3 (FIGS. 3B through 3F)) in that the continuous fibers parallel the Z axis and accordingly the radial axis of the cog. The carbon warp threads and woof threads illustrated in FIG. 3A are essentially at a right angle to each other and parallel or perpendicular to the wide base 17 of cog 3, terminating in the vicinity of crest 18 and in that of sides 6 more or less along the normals to these surfaces.

Figure 3B:
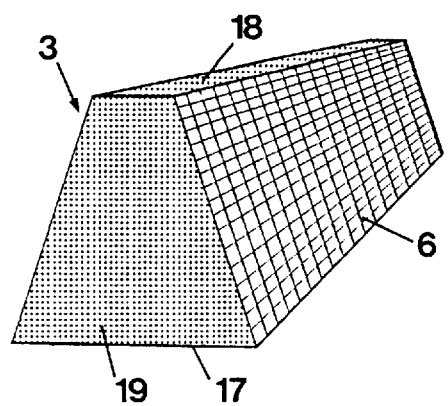

The fibers, the warp threads and woof threads, that is, in the embodiment of cog 3 illustrated in FIG. 3B extend tangential to sides 6 and terminate again in the vicinity of crest 18 and at trapezoidal face 19, essentially along the normals to crest 18 and face 19, that is. A structure of this type, with its fibers oriented tangential in the vicinity of side 6, is particular resistant to abrasion.

Figure 3C:
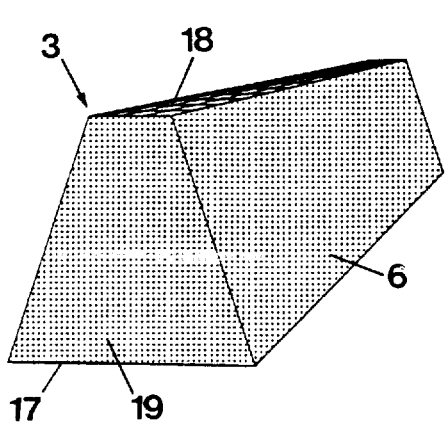

The warp threads and woof threads of the fiber lattice in the structure illustrated in FIG. 3C are oriented parallel to the surface of crest 18, and accordingly terminate in the vicinity of side 6 and in the vicinity of trapezoidal face 19 and perpendicular to these surfaces. A structure of this type is particularly resistant to thermal expansion along the width of the cog (along the Y axis).

Figure 3D:
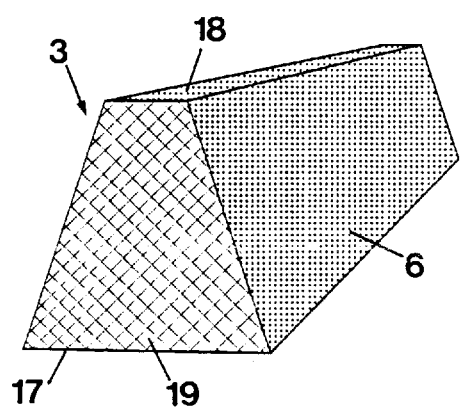

The embodiment illustrated in FIG. 3D is similar to the one illustrated in FIG. 3A except that some of the warp threads and woof threads are at an angle of 45° to base 17. This orientation results in quasi-isotropic properties, and a cog 3 of this type can be used wherever its major regions are subjected to uniform loads.

The fiber orientations in the embodiments illustrated in FIGS. 3A through 3D are preferred because of the advantages hereintofore specified. It will, however, be obvious that various other orientations can be employed, three-dimensional in particular, meaning that a third fiber orientation is added to the various orientations of the warp threads and woof threads illustrated in FIGS. 3A through 3D and specified with reference thereto. This third orientation is essentially at a right angle to that of the warp threads and woof threads illustrated in FIG. 3A through 3D.

Such an orientation can in particular contribute to separation of the functions of the inside of the cog, which is mainly subjected to bending and tensile stresses, from those of the outer region, which is where the cog engages other cogs and is primarily subject to thrust, combining the specific advantages achieved in the embodiments illustrated in FIGS. 3A through 3D.

Figure 3E:
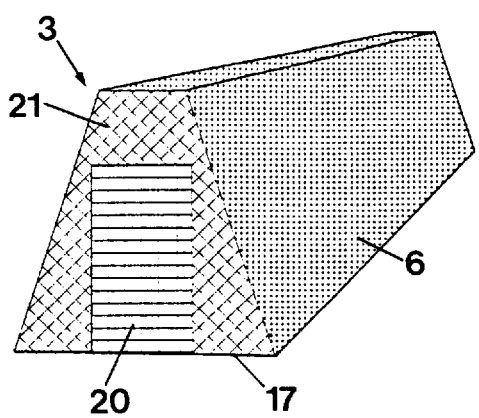
Figure 3F:
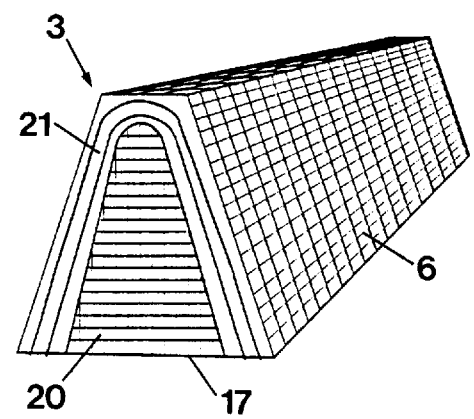

FIGS. 3E and 3F illustrate two cogs 3 with modular structures. "Modular" in the present sense means that the cogs 3 comprise a core 20 and a jacket 21. Both the sides and the face of core 20 are preferably enclosed in jacket 21, which accordingly constitutes the cog's sides 6 and crest 18, whereas core 20 extends down to its base 17.

The core of the embodiment illustrated in FIG. 3E is constructed of a fiber lattice wherein the warp threads and woof threads are oriented like those in the cog 3 illustrated in FIG. 3A. The warp threads and woof threads in jacket 21 on the other hand are oriented like those in the cog 3 illustrated in FIG. 3D. The core 20 of the cog 3 in this modular structure constitutes a fracture-resistant support, and jacket 21 a highly abrasion-resistant surface.

Whereas the core 20 of the embodiment illustrated in FIG. 3F is rectangular in cross-section, the cross-section in the embodiment illustrated in FIG. 3F is triangular, essentially matching the outer contour of cog 3. The individual warp threads and woof threads are again oriented like those in the core 20 illustrated in FIG. 3E. In contrast to the jacket 21 illustrated in FIG. 3E, the jacket 21 in the embodiment illustrated in FIG. 3F is wound, meaning that the vertical layers of fiber are applied layer by layer around the sides of core 20 as will be evident in the face 19 of the cog 3 of FIG. 3F. The fibers in jacket 21 are oriented like those in the embodiment of the cog 3 illustrated in FIG. 3B. The advantage of this embodiment is that roughly dimensioned cores more or less similar in shape to the final cog can be finished by means of a simple application procedure.

Cogs like those illustrated in FIG. 3F can be effectively fabricated by first producing a core 20 with a rhomboidal cross-section; that is, a cross-sectional shape reflected (mirror imaged) about the base 17 of the cog 3. The jacket layers are then wound all around it. Thereafter, the resulting preliminary shape is split in two along the base into two cogs 3 of the type illustrated in FIG. 3F.

Figure 4A:
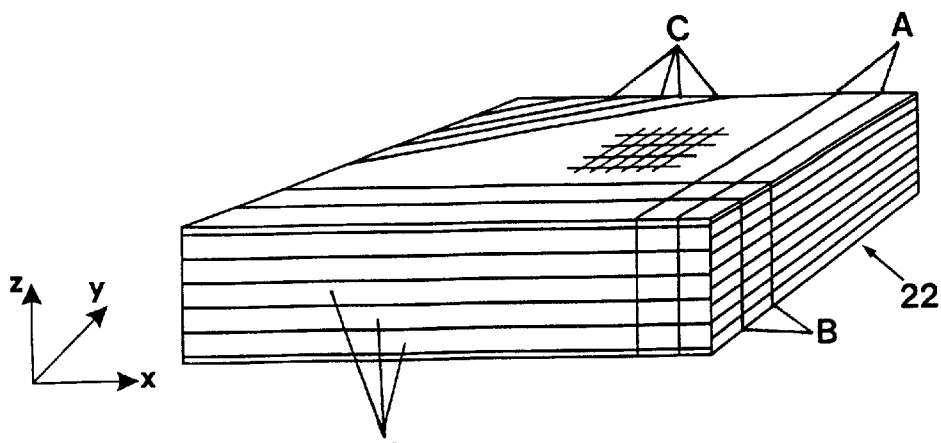
FIGS. 4A through 4C illustrate three steps in the production of cog contours from a slab (4A).
Figure 4B:
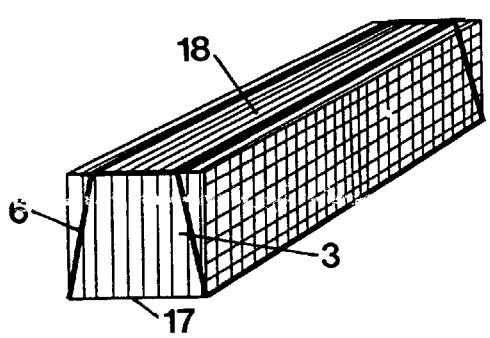
Figure 4C:
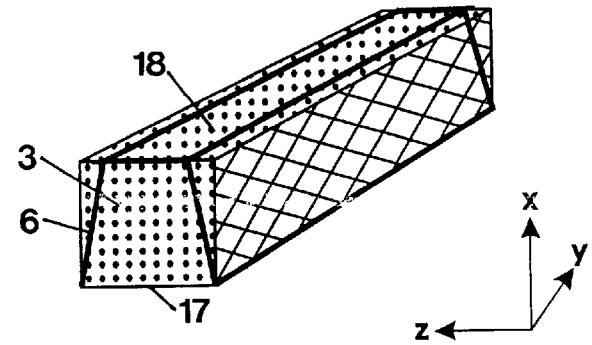
Figure 5:
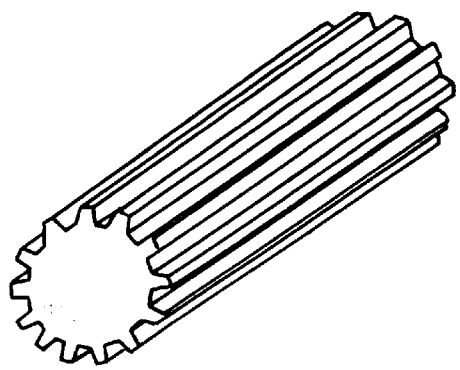
FIG. 5 is a schematic illustration of a cogged component in the form of a splined shaft.

Cogs like those illustrated in FIG. 3 can be effectively fabricated by the procedure illustrated in FIGS. 4A, 4B, and 4C.

In this procedure, a slab 22 of individual layers 23 of carbon fibers stacked parallel to the Z axis is produced, whereby the warp threads and woof threads extend along the X and Y planes as represented in the top of the slab. Cogs of the various fiber orientations illustrated in FIGS. 3A, 3B, 3C, and 3D can then fabricated from such a slab.

Strips or blocks that are as wide in the X direction or Y direction as the eventual cog will be long (high) are for example cut along line A or line B out of slab 22, which is as thick (in the Z direction) as the eventual base 17 will be wide, The resulting blank is then rotated 90° to obtain the fiber orientation illustrated in FIG. 4B. A cog 3 with sides 6 is then machined out of the resulting section.

If the cuts C illustrated in FIG. 4A are made in slab 22, at a 45° angle to the X ad Y axes, that is, and if the resulting piece is rotated 90°, the result will be a section with the fiber orientations illustrated in FIG. 4C. A cog is then machined out of this blank with fibers oriented as indicated by the lines and points in FIG. 4C.

The specific orientation of the fibers in the vicinity of the sides 6 and crest 18 of cog 3 depends on the position of cuts A, B, and C, which are basic cuts. The number of fiber orientations can be determined, however, not only by the position of the cuts but also because of the quasi-isotropic construction of slab 22. The individual layers of carbon fabric are for this purpose applied not just paralleling the X and Y axes but also alternatingly at specified angles to those axes and symmetrical to the midline of the laminate, at angles for example of 0, 90, +45, −45, 90, and 0° to the angle between the warp threads and the X axis for a six-layer laminate.

Very different types of known cogged components can be fabricated with the aforesaid method. Radial-cog and beveled-cog wheels, worm wheels, pinions, belt pulleys, crown gears, racks, and splined shafts like the one illustrated in FIG. 5 can for example all be manufactured by more or less the same procedure.

There has thus been shown and described a novel cogged component for the mechanical transmission of force which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In a cogged component intended for the mechanical transmission of force and with a body of a composite reinforced with carbon fibers, the improvement wherein said body is of fiber-reinforced ceramic comprising a lattice of essentially continuous carbon fibers and a matrix that contains carbon, whereby the fibers in the lattice are sheathed in silicon carbide formed essentially by liquid silicon infiltrating the lattice at temperatures of at least 1450° C. in vacuum and reacting said silicon with the carbon in the matrix to form said silicon carbide, and wherein the cogs are constructed either of a similar fiber-reinforced ceramic with a load-accommodating fiber orientation or of a monolithic silicon carbide based ceramic.

2. The component defined in claim 1, wherein the body and the cogs are fabricated separately and form-fit and force-fit together.

3. The component defined in claim 2, wherein the cogs are fastened to the body by a layer essentially containing silicon carbide or pure silicon.

4. The component defined in claim 1, wherein the cogs are of sintered, pressed, or reaction-bonded silicon carbide.

5. The component defined claim 1, wherein at least some of the lattice of fibers in the cogs is constructed of two-dimensional layers of fabric with the warp threads and woof threads at a right angle to each other.

6. The component defined in claim 5, wherein the cogs comprise a core covered with a jacket of abrasion-resistant fiber-reinforced ceramic.

7. The component defined in claim 6, wherein the core is made of carbon.

8. The component defined in claim 6, wherein the core is of 18 fracture-resistant fiber-reinforced ceramic.

9. The component defined in claim 6, wherein the jacket is wound around the core.

10. The component defined in claim 1, wherein a substantial portion of the carbon fibers are oriented paralleling the longitudinal axis of the cogs.

11. The component defined in claim 1, wherein, if the cogs are subject to thrust, a substantial portion of the carbon fibers are oriented tangential to the sides of the particular cog.

12. A component in the form of a cogwheel as defined in claim 1, wherein the body is annular and the carbon fibers are oriented along its circumference.

13. The component defined in claim 1, wherein the body and/or the cogs are fabricated from a slab of fiber-reinforced ceramic.

14. The component defined in claim 1, wherein the cogs are wedged into the body.

15. The component defined in claim 14, further comprising a groove in the body that matches the wedge of the cogs.

16. The component defined in claim 15, wherein the cogs are trapezoidal in cross-section, with the base of the trapezoid fitting into the groove in the body.

17. The component defined in claim 1, wherein at least a portion of said component is coated to protect it from corrosion and oxidation.

18. The component defined in claim 17, wherein the protective coat is of silicon carbide.

19. The component defined in claim 1, wherein the cogs have an elongation at rupture higher than 0.1%.

20. The component defined in claim 7, wherein the core is made of graphite.

* * * * *